United States Patent
Marupaduga et al.

(10) Patent No.: US 10,951,385 B1
(45) Date of Patent: Mar. 16, 2021

(54) SELECTIVE CONFIGURATION OF INTER-BAND OR INTRA-BAND CARRIER AGGREGATION

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/397,292

(22) Filed: Apr. 29, 2019

(51) Int. Cl.
*H04W 72/04* (2009.01)
*H04L 5/00* (2006.01)
*H04L 27/26* (2006.01)
*H04W 76/15* (2018.01)
*H04W 76/18* (2018.01)

(52) U.S. Cl.
CPC ............ *H04L 5/0098* (2013.01); *H04L 5/001* (2013.01); *H04L 27/2601* (2013.01); *H04W 72/0453* (2013.01); *H04W 76/15* (2018.02); *H04W 76/18* (2018.02)

(58) Field of Classification Search
CPC ... H04L 5/0098; H04L 5/001; H04L 27/2601; H04W 76/15; H04W 76/18; H04W 72/0453
See application file for complete search history.

(56) References Cited

U.S. PATENT DOCUMENTS

| | | | | |
|---|---|---|---|---|
| 2015/0223212 A1* | 8/2015 | Der Velde | ............. | H04W 76/15 370/329 |
| 2015/0334765 A1* | 11/2015 | Rahman | ................ | H04W 76/15 370/328 |
| 2019/0090218 A1* | 3/2019 | Noh | ....................... | H04L 5/0062 |
| 2019/0230663 A1* | 7/2019 | Lim | ........................ | H04L 5/001 |

* cited by examiner

*Primary Examiner* — Kevin C. Harper
*Assistant Examiner* — Derrick V Rose (57) ABSTRACT

When a wireless communication system serves a UE over a connection according to a first radio access technology (RAT) and the connection encompasses a carrier in a first band (first-band carrier), the system decides of whether to configure for the UE's connection intra-band carrier aggregation by adding to the connection another first-band carrier or rather to configure for the UE's connection inter-band carrier aggregation by adding to the connection a second-band carrier, with the decision being based on a determination of whether (i) the other first-band carrier is usable in providing service under a second RAT different than the first RAT and (ii) the candidate second-band carrier is not usable in providing service under the second RAT. The system then configures carrier-aggregation in accordance with the decision.

20 Claims, 4 Drawing Sheets

SELECTIVE CONFIGURATION OF INTER-BAND OR INTRA-BAND CARRIER AGGREGATION

BACKGROUND

A wireless communication system typically includes a number of base stations that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated) can operate. Each base station could be coupled with a core network that provides connectivity with various application servers and/or transport networks, such as the public switched telephone network (PSTN) and/or the Internet for instance. With this arrangement, a UE within coverage of the system could engage in air interface communication with a base station and could thereby communicate via the base station with various application servers and other entities.

Such a system could operate in accordance with a particular radio access technology (RAT), with communications from the base stations to UEs defining a downlink or forward link and communications from the UEs to the base stations defining an uplink or reverse link.

In accordance with the RAT, each base station could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Still further, each such carrier could be defined within an industry specified frequency band. Examples of such frequency bands include, without limitation, (i) B25, which supports FDD carriers and extends from 1850 MHz to 1915 MHz on the uplink and 1930 MHz to 1995 MHz on downlink, (ii) B26, which supports FDD carriers and extends from 814 MHz to 849 MHz on the uplink and 859 MHz to 894 MHz on the downlink, and (iii) B41, which supports TDD carriers and extends from 2496 MHz to 2690 MHz.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

OVERVIEW

When a UE that is operating according to a given RAT and enters into coverage of an example network, the UE could detect threshold strong coverage of a base station (e.g., a threshold strong reference signal broadcast by the base station) on a particular carrier and could then engage in random-access and Radio Resource Control (RRC) signaling to establish an RRC connection through which the base station will serve the UE on that carrier. Further, if the UE is not already registered for service with the core network, the UE could transmit to the base station an attach request, which the base station could forward to a core-network controller for processing. And the core network controller could then coordinate setup for the UE of one or more bearers extending between the UE and a core-network gateway that provides transport-network connectivity.

Once the UE is so connected and registered, the base station could then serve the UE in a connected mode on the carrier, managing downlink air-interface communication of packet data to the UE and uplink air-interface communication of packet data from the UE in accordance with the RAT.

For example, when packet data for the UE arrives at the core network from a transport network, the data could flow to the UE's serving base station, and the base station could then schedule and provide transmission of that data to the UE on particular downlink air-interface resources of the carrier. Likewise, when the UE has data to transmit on the transport network, the UE could transmit a scheduling request to the base station, the base station could responsively schedule transmission of that data from the UE on particular uplink air-interface resources of the carrier, and the UE could accordingly transmit the data to the base station for forwarding through the core network to the transport network.

As the industry advances from one generation of wireless technology to the next, networks and UEs may also support simultaneous connectivity on connections according to multiple different RATs. With the transition from 4G LTE to 5G NR, for instance, it is expected that some UEs will be configured to support connections according to both of those RATs concurrently, with an arrangement referred to as EUTRA-NR Dual Connectivity (EN-DC). To facilitate this, a UE could include both a 4G LTE radio that establishes a 4G LTE connection on a 4G LTE carrier with a 4G LTE base station and a 5G NR radio that establishes a 5G NR connection on a 5G NR carrier with a 5G NR base station. The UE could then be served with packet-data communications on both connections concurrently, with a portion of data flowing over the UE's 4G LTE connection concurrently with another portion of the data flowing over the UE's 5G NR connection.

More generally, dual-connectivity service of a UE involves the UE having co-existing connections according to multiple different RATs and being served with packet-data communication concurrently on those multiple different-RAT connections. This is to be distinguished from stand-alone (or single-connectivity) service of a UE, where the UE is served with packet-data communication according to just a single RAT, such as with just a 4G connection or just a 5G connection.

Dual-connectivity can thus leverage and/or facilitate transition of a network from one RAT to another. Further, dual connectivity can help to provide UEs with increased peak data rate by multiplexing packet-data onto multiple concurrent connections. For instance, a UE that supports EN-DC service could connect initially with a 4G base station, and the 4G base station could then add a secondary 5G connection for the UE to help increase the UE's peak data rate. Dual-connectivity could thus be desirable for a UE that is or will be engaged in high-throughput communication.

In addition, when a UE is so served by a base station according to a given RAT, regardless of whether the service is standalone on that RAT or is part of dual-connectivity on that RAT together with another RAT, the base station could also configure carrier-aggregation service of the UE on that RAT.

Carrier-aggregation service of a UE on a given RAT involves service of the UE concurrently on an aggregation of multiple carriers according to the RAT. For instance, if a UE is served by a base station with 4G LTE connection on a first carrier, the base station could configure carrier-aggregation service for the UE by adding to the UE's 4G LTE connection one or more additional carriers. The base station could then provide the UE with carrier-aggregation service under 4G LTE on that combination of carriers. Implementation of carrier-aggregation service on a given RAT can also help to provide increased peak data rate, as the combined bandwidth of the aggregated carriers provides greater air-interface capacity than any single one of the carriers. Therefore, carrier-aggregation service could be desirable for a UE that is or will be engaged in high-throughput communication or in other situations.

With carrier-aggregation service, each carrier on which the UE is served is considered a component carrier. One such carrier, perhaps the carrier on which the UE initially connects with the base station, is considered a primary component carrier (PCC) of the UE's connection and might be the anchor for some or all control-plane signaling between the UE and the base station. Each of one or more additional carriers that the base station adds to the UE's connection is then considered a secondary component carrier (SCC) of the UE's connection, in place to help increase the UE's peak data rate for instance.

When a base station is going to configure carrier-aggregation service for a UE, the base station may face a choice of whether to configure intra-band carrier aggregation or rather inter-band carrier aggregation. As these terms suggest, intra-band carrier aggregation would be where the multiple carriers in the UE's connection are all in the same band as each other—such as all in B41 for instance, and inter-band carrier aggregation would be where at least two carriers in the UE's connection are within different bands than each other—such as with one in B41 and another in B25 for instance.

By way of example, if a UE currently has a connection with a base station on just one B41 carrier and the base station is going to configure carrier-aggregation service for the UE, the base station may face a choice of whether to add to that connection another B41 carrier, thus configuring intra-band carrier-aggregation service for the UE, or rather to add to the connection a B25 carrier (or other non-B41 carrier), thus configuring inter-band carrier-aggregation service for the UE. (Likewise, this configuration question could arise if the UE is already served with intra-band carrier aggregation, such as a connection that encompasses a combination of B41 carriers, the issue in that situation being whether the base station should add to that connection another carrier in the same band or rather a carrier in a different band.)

Disclosed herein is a mechanism to help a base station decide which of these types of carrier-aggregation service to configure for a UE in such a situation. In particular, the disclosure addresses a scenario where a base station serves a UE in accordance with a first RAT on a connection that encompasses a carrier in a first band, and where the base station faces a choice of whether to add to that connection another candidate carrier in the first band or rather a candidate carrier in a second band. For instance, this question could arise if the base station has received from the UE a report that the UE is in sufficient coverage of both candidate carriers. Or the question could arise as to whether the base station should direct the UE to scan for and report candidate secondary coverage in just the first band or also/alternatively in the second band.

Per the disclosure, in this situation, the base station's decision of whether to configure for the UE's first-RAT connection intra-band carrier aggregation or rather inter-band carrier aggregation will be based at least in part on a determination of whether (i) the candidate first-band carrier is usable in providing service over a second RAT different than the first RAT and (ii) the candidate second-band carrier is not usable in providing service under the second RAT.

In terms of usability of carriers in providing second-RAT service, for instance, at issue could be whether first-band carriers are authorized (e.g., per industry specifications) for use as second-RAT carriers but that second-band carriers are not authorized for use as second-RAT carriers. Or, perhaps if the UE will be served with standalone first-RAT service, at issue could be whether first-band carriers are authorized for use as first-RAT carriers in dual-connectivity service on the first RAT and second RAT but that second-band carriers are not authorized for use as first-RAT carriers in such dual-connectivity service.

In response to a determination that the candidate first-band carrier is usable in providing service under the second RAT and the candidate second-band carrier is not usable in providing service under the second RAT, the base station could opt to configure inter-band carrier-aggregation service for the UE's first-RAT connection rather than configuring intra-band first-RAT carrier-aggregation service for that connection. Thus, the base station could add to the UE's first-RAT connection the candidate second-band carrier rather than the candidate first-band carrier.

From a technical standpoint, this process may help to preserve resources to facilitate providing second-RAT service. Namely, the process may help to avoid having the UE's first-RAT connection consume resources of the candidate first-band carrier in a situation where that first-band carrier is usable in providing second-RAT service and where the second-band carrier is not usable in providing second-RAT service.

As a particular example of this, consider a scenario where a base station is currently serving the UE on a 4G LTE connection encompassing one or more B41 carriers, and the base station faces a choice of whether to add to the UE's 4G LTE connection another candidate B41 carrier or rather a candidate B25 carrier. In this scenario, at issue could be whether B41 carriers are usable in providing 5G NR service (e.g., as 5G-NR carriers, or as 4G-LTE carriers in EN-DC service).

Here, it may be the case that industry specifications and/or other policies (e.g., government or operator-dictated policies) authorize use of B41 carriers for use to provide 5G NR service and do not authorize B25 carriers for use to provide 5G NR service. Or it may be the case that B41 carriers are authorized to be used as 4G LTE carriers in EN-DC service but that B25 carriers are not authorized to be used as 4G carriers in EN-DC service. On either or both of these bases or other such basis, the base station could thus decide to configure inter-band carrier-aggregation service for the UE rather than configuring intra-band carrier-aggregation service for the UE. Thus, the base station could add to the UE's 4G LTE connection the candidate B25 carrier rather than adding to the UE's 4G LTE connection the candidate B41 carrier. And optimally, this could help preserve resources of the candidate B41 carrier for use in providing 5G NR service, while enabling 4G LTE carrier-aggregation service for the UE on a combination of the UE's current serving one or more B41 carriers and the added B25 carrier.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a cell site that is licensed to operate on multiple B41 carriers and on at least one B25 carrier, and where the cell site is configured to provide both 4G LTE service and 5G NR service, and perhaps also EN-DC service. Under current industry specifications, B41 carriers are authorized to be used as 4G LTE carriers and are also authorized to be used as 5G NR carriers, and B25 carriers are authorized to be used as 4G LTE carriers but are not authorized to be used as 5G NR carriers. Further, under current industry specifications or otherwise in the example implementation, B41 carriers are authorized to be used as 4G LTE carriers in EN-DC service, but B25 carriers are not authorized to be used as 4G LTE carriers in EN-DC service).

At issue in this example implementation could then be whether, when that base station is serving a UE over a 4G LTE connection on a B41 carrier and is going to configure 4G LTE carrier-aggregation service for the UE, the base station should configure intra-band carrier-aggregation service by adding another one of the cell site's B41 carriers to the UE's 4G LTE connection or rather should configure inter-band carrier aggregation service by adding the B25 carrier to the UE's 4G LTE connection.

It should be understood, however, that the principles disclosed herein could extend to apply with respect to other scenarios as well, such as with respect to other radio access technologies and/or with other band and RAT authorizations or policies. Further, it should be understood that other variations from the specific arrangements and processes described are possible. For instance, various described entities, connections, functions, and other elements could be added, omitted, distributed, re-located, re-ordered, combined, or changed in other ways. And it should be understood that operations described as being carried out by one or more entities could be carried out by programmed processing units and/or or by various hardware or other implementations.

Figure 1:
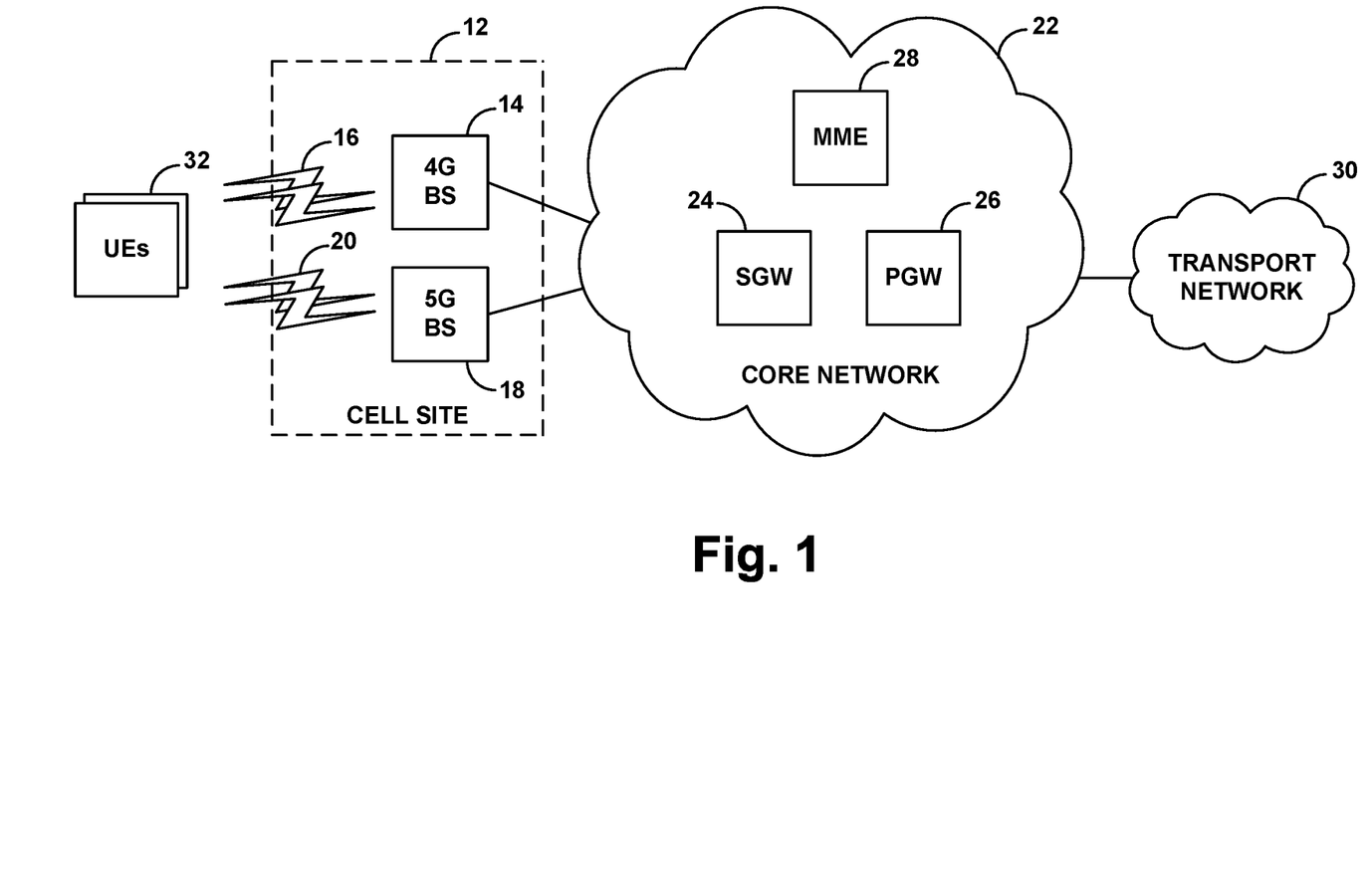
FIG. 1 is a simplified block diagram of an example system in which features of the present disclosure can be implemented.

FIG. 1 depicts an example system including a cell site 12 that contains a 4G LTE (4G) base station 14 that is configured to provide 4G service on one or more 4G carriers 16 and a 5G NR (5G) base station 18 that is configured to provide 5G service on one or more 5G carriers 20.

These base stations could be integrated together as a common base station unit or could be provided separately, possibly sharing certain components such as an antenna tower, a baseband unit, and a backhaul interface for example. Further, each such base station could take various forms, such as a macro base station, a small-cell base station, a relay, or other type of base station.

In a representative implementation as noted above, this cell site could be licensed to provide service on multiple B41 carriers and on at least one B25 carrier. For instance, the cell site might be licensed to provide service on B41 carriers of the set {F1, F2, F2, F4}, and on a B25 carrier F5. Further, in line with the discussion above, the cell site might be able to designate each B41 carrier respectively and dynamically for use as either a 4G carrier on which to provide 4G service or a 5G carrier on which to provide 5G service. Whereas the cell site may designate the B25 carrier for use just as a 4G carrier on which to provide 4G service.

Here, 4G service on a 4G carrier can differ from 5G service on a 5G carrier in various ways now known or later developed. For instance one of these RATs could implement variable subcarrier spacing and the other could have fixed subcarrier spacing, one could have flexible TDD configuration and the other could have fixed TDD configuration, one could have different symbol time segments than the other, and/or one could make different use of MIMO technologies than the other, among other possibilities.

In representative 4G and 5G implementations, each carrier respectively could be FDD or TDD and could thus define separate downlink and uplink frequency channels or a single frequency channel multiplexed over time between downlink and uplink use. (Per industry specifications, B41 carriers are TDD carriers, and B25 carriers are FDD carriers.) In any event, each frequency channel of a carrier could be characterized by a defined frequency bandwidth and center frequency as noted above, and each carrier may have a unique carrier identifier.

Coverage provided by a 4G or 5G base station on a given carrier could be divided over time into frames, subframes, timeslots, and symbol time segments, and over frequency into subcarriers, thus defining an array of air-interface resource elements in which subcarriers can be modulated to carry data. Further, in each subframe, timeslot, or the like, the resource elements could be divided into groups defining physical resource blocks (PRBs), which the base station could allocate for use to carry data to or from served UEs.

As further shown, the example 4G and 5G base stations 14, 18 are both connected with a common core network 22, such as an Evolved Packet Core (EPC) network or Next Generation Core (NGC) network. In the example shown, the core network includes a serving gateway (SGW) 24, a packet data network gateway (PGW) 26, and a mobility management entity (MME) 28. But other core-network arrangements are possible as well. And in another implementation, the 4G and 5G base stations could be connected with separate core networks.

In practice, the 4G base station could have an interface with the SGW, the SGW could have an interface with the PGW, and the PGW could provide connectivity with a transport network 30. Further, the 4G base station could have an interface with the MME, and the MME could have an interface with the SGW, so that the MME could coordinate setup of bearer connections for a UE to enable the UE to engage in packet-data communication via 4G connection between the UE and the 4G base station.

Likewise, the 5G base station could have an interface with the SGW and MME, and the MME could have an interface with the SGW, so that the MME could coordinate setup of bearer connections for a UE to enable the UE to engage in packet-data communication via a 5G connection between the UE and the 5G base station. Alternatively, the 5G base station may operate as a secondary node with the 4G base station operating as master node for EN-DC service of a UE, in which case the 4G base station may be the anchor for signaling with the MME and perhaps further for bearer communication for the EN-DC service.

FIG. 1 further depicts example UEs 32 that may concurrently or from time to time be within coverage of 4G base station 14 and/or 5G base station 18. In a representative implementation, all of these UEs are configured with a 4G radio and associated components to establish a 4G connection with the 4G base station and to be served according to 4G over that connection. And at least some of the UEs may also be configured with a 5G radio and associated components to establish a 5G connection with the 5G base station and to be served according to 5G over that connection. Some of the UEs may thus be served with 4G-only service by the 4G base station or with 5G-only service by the 5G base station. And other of the UEs may be served with EN-DC service by the 4G base station and the 5G base station.

When a UE initially enters into coverage of the 4G base station, the UE could detect coverage of the 4G base station on a particular carrier and the UE could engage in signaling with the base station to establish a 4G RRC connection. In addition, the UE could then engage in attach signaling with the MME via the UE's 4G connection, and the MME could set up one or more bearers for the UE to enable the UE to engage in packet-data communication over the UE's 4G connection.

Further, the 4G base station could establish for the UE a context record and could store in the UE context record various connection, service, and capabilities data for the UE. For instance, the 4G base station could store in the context record an identifier of the UE's established 4G connection and an identifier of the 4G carrier on which the UE is connected. And the 4G base station could obtain and store in the UE context record an indication of whether the UE supports EN-DC service and/or whether the UE supports carrier-aggregation service.

Once the UE is connected with the 4G base station on the 4G carrier, the 4G base station could serve the UE as discussed above. In particular, when the 4G base station receives packet-data for transmission to the UE, the 4G base station could select downlink PRBs on the 4G carrier to carry the data to the UE, and the base station could schedule and provide transmission of the data to the UE on those PRBs. And when the UE has packet-data for transmission to the 4G base station, the 4G base station could select uplink PRBs on the 4G carrier to carry the data from the UE and could schedule that transmission, and the UE could accordingly transmit the data to the base station on those PRBs.

If the UE supports EN-DC service, the 4G base station could also coordinate setup of EN-DC service for the UE. To do so, the 4G base station could direct the UE to scan for coverage on one or more 5G carriers, and the UE could responsively report to the 4G base station that the UE detects coverage of 5G base station 16 on a 5G carrier. Given this, the 4G base station could then engage in inter-base-station signaling with the 5G base station to arrange for setup of a 5G RRC connection on the 5G carrier between the 5G base station and the UE, and the 4G base station could further coordinate or engage in signaling with the MME to trigger setup for the UE of a split bearer, so that the UE's packet-data communication can then be multiplexed between the UE's 4G connection and the UE's 5G connection. With EN-DC service so set up, as noted above, a portion of the UE's data could flow over the UE's 4G connection while another portion of the UE's data could flow over the UE's 5G connection.

Further or alternatively, if the UE supports carrier-aggregation service, the 4G base station could set up carrier-aggregation service for the UE by configuring the UE's 4G RRC connection to encompass multiple 4G carriers. In particular, if the 4G base station is serving the UE on just a single 4G carrier, the 4G base station could add at least one more 4G carrier to the UE's RRC connection and then serve the UE on a combination of those 4G carriers. Or if the 4G base station is already providing the UE with 4G carrier-aggregation service, the 4G base station could add one or more additional or other 4G carriers to the UE's connection.

To do this, the 4G base station could direct the UE to scan for coverage on one or more 4G carriers on which the UE is not currently being served, and the UE could responsively provide the 4G base station with a measurement report specifying the 4G carriers of sufficient strength that the UE detects. The 4G base station could then select at least one of the reported 4G carriers and could add that 4G carrier to the UE's 4G RRC connection along with the UE's existing 4G carrier(s). In particular, the 4G base station could transmit to the UE an RRC connection-reconfiguration message that specifies each of multiple 4G carriers on which the 4G base station will now serve the UE, indexing one carrier as the UE's primary component carrier and each additional carrier as a secondary component carrier. And the base 4G station could update its context record for the UE to indicate the inclusion of the additional 4G carrier in the UE's 4G RRC connection.

The 4G base station could then provide the UE with 4G carrier-aggregation service on the combination of 4G carriers now encompassed by the UE's 4G RRC connection. For instance, when the 4G base station has data to transmit to the UE, the 4G base station could schedule transmission of a portion the data to occur on one or more PRBs of the UE's primary component carrier concurrent with transmission of another portion of the data to occur on one or more PRBs of the UE's secondary component carrier, and the 4G base station could transmit the data to the UE accordingly.

As noted above, at issue in the present example when the base station is going to configure carrier-aggregation service for a UE by adding another carrier to the UE's 4G connection that currently encompasses a B41 carrier is whether the base station should configure intra-band carrier-aggregation by adding another B41 carrier or rather should configure inter-band carrier-aggregation by adding a B25 carrier.

As indicated above, this issue could arise when the base station has received from the UE a report that the UE is in threshold strong enough coverage of both the new B41 carrier and the new B25 carrier, such that both of those carriers are candidates to be added to the UE's 4G connection, or if the base station could assume that that is the case based on propagation data or the like. Or this issue could arise when the base station is going to direct the UE to scan for secondary 4G coverage and could direct the UE to scan just for B41 coverage, just for B25 coverage, or either/both.

For simplicity of discussion, we can assume by way of example that the UE's 4G connection currently encompasses just B41 carrier F1 and that, at issue is whether the base station should configure intra-band carrier aggregation for the UE by adding to that connection B41 carrier F2 or rather should configure inter-band carrier aggregation for the UE by adding to that connection B25 carrier F5.

Per the present disclosure, as noted above, the base station could resolve this issue based on whether (i) B41 carrier F2 is usable in providing 5G service and (ii) B25 carrier F5 is not usable in providing 5G service. And in particular, based at least on B41 carrier F2 being usable in providing 5G service and B25 carrier F5 not being usable in providing 5G service, the base station could decide to configure inter-band carrier aggregation for the UE by adding B25 carrier F5 to the UE's 4G connection rather than configuring intra-band carrier aggregation service for the UE by adding B41 carrier F2 to the UE's 4G connection.

For example, the basis for taking this approach could be that B41 carrier F2 can be used as a 5G carrier but B25 carrier F5 cannot be used as a 5G carrier. To help preserve resources for use to provide UEs with 5G service, the base station could thus use B25 carrier F5 in the UE's 4G carrier-aggregation service, leaving B41 carrier F2 or the resources of B41 carrier F2 for use to provide UEs with 5G service.

Or the basis for taking this approach could be that B41 carrier F2 can be used as a 4G carrier in EN-DC service but B25 carrier F5 cannot be used as a 4G carrier in EN-DC service. This basis may be relevant only where the UE is not itself served, or going to be served, with EN-DC. To help preserve resources for use to provide other UEs with EN-DC service, the base station could thus use B25 carrier F5 in the UE's 4G carrier-aggregation service, leaving B41 carrier F2 or the resources of B41 carrier F2 for use to provide other UEs with 4G service as part of EN-DC service.

Note also that the base station could make this determination based on a further consideration of one or more additional factors. For instance, an added basis for the base station adding the B25 carrier rather than the B41 carrier to the UE's 4G connection could be that there is a threshold high level of load (e.g., PRB utilization, number of served UEs, etc., at least as high as a predefined threshold level deemed to represent high load) on the set of B41 carriers that could be used in providing 5G service. Given such heavy load, it could be even more beneficial to add to the UE's 4G connection the B25 carrier rather than the B41 carrier. Other factors could be considered as well.

Figure 2:
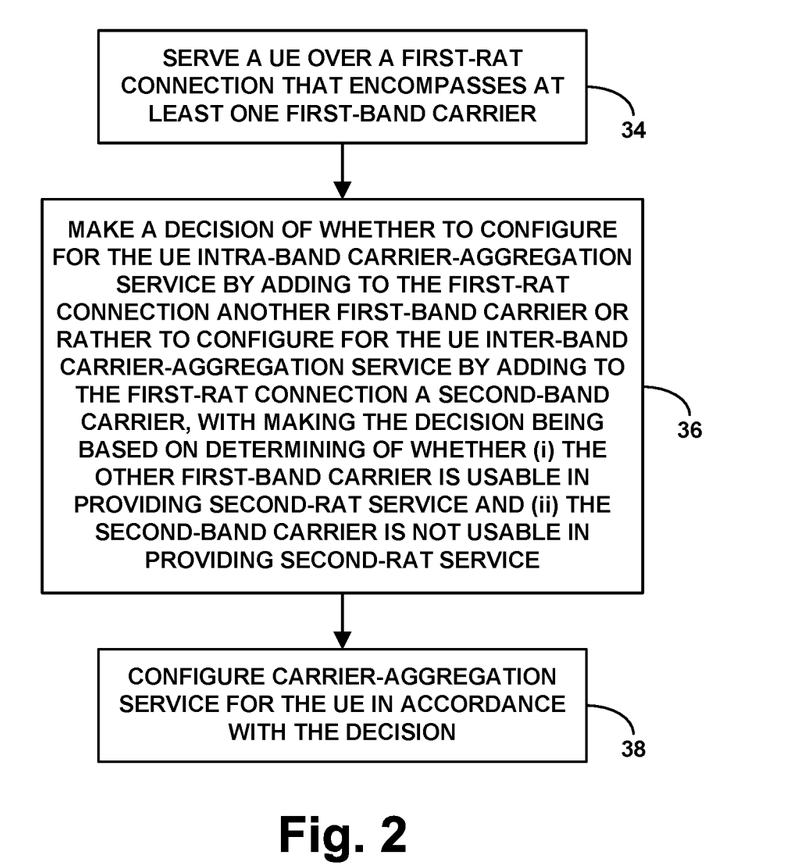
FIG. 2 is a flow chart depicting an example method in accordance with the present disclosure.

FIG. 2 is a flow chart depicting a method that could be carried out in accordance with this disclosure, for a wireless communication system to configure service of a UE. In line with the discussion above, the wireless communication system supports a first RAT (e.g., 4G LTE) and a second RAT (e.g., 5G NR) and operation on carriers in a first band (e.g., B41) (first-band carriers) and at least one carrier in a second band (e.g., B25) (second-band carrier). Further, the method could be carried out by or on behalf of a base station in such a system and/or by one or more other entities of the system.

As shown in FIG. 2, at block 34, the method includes the system serving the UE over a first-RAT connection that encompasses at least one of the first-band carriers (e.g., just one or more first-band carriers). Further, at block 36, the method includes the system making a decision of whether to configure for the UE intra-band carrier-aggregation service by adding to the first-RAT connection another one of the first-band carriers or rather to configure for the UE inter-band carrier-aggregation service by adding to the first-RAT connection the second-band carrier, with making the decision being based on determining of whether (i) the other one of the first-band carriers is usable in providing second-RAT service and (ii) the second-band carrier is not usable in providing second-RAT service. And at block 38, the method includes the system configuring carrier-aggregation service for the UE in accordance with the decision.

As discussed above, the act of making the decision in this process could involve deciding to configure the inter-band carrier aggregation rather than the intra-band carrier aggregation, with that decision being based on determining that (i) the other first-band carrier is usable in providing second-RAT service and (ii) the second-band carrier is not usable in providing second-RAT service. And this decision could be additionally based on a determination that there is threshold heavy load on the first-band carriers (e.g., on the other one of the first-band carriers, or on the first-band carriers cooperatively).

Further, as discussed above, the determining of whether the other one of the first-band carriers is usable in providing second-RAT service and the second-band carrier is not usable in providing second-RAT service could involve determining that (i) the other one of the first-band carriers is usable as a second-RAT carrier and (ii) the second-band carrier is not usable as a second-RAT carrier. Alternatively or additionally, the determining could involve determining that (i) the other one of the first-band carriers is usable as a first-RAT carrier in dual-connectivity service on the first RAT and the second RAT and (ii) the second-band carrier is not usable as a first-RAT carrier in dual-connectivity service on the first RAT and the second RAT. And this latter implementation could apply, for instance, where the UE is not served with dual-connectivity service on the first RAT and the second RAT.

Still further, as discussed above, the act of configuring carrier-aggregation service for the UE could involve transmitting over the air to the UE a connection-reconfiguration message that specifies multiple carriers encompassed by the first-RAT connection.

Yet further, as discussed above, the act of making the decision of whether to configure the intra-band carrier-aggregation service or rather the inter-band carrier-aggregation service could involve deciding whether to add to the first-RAT connection the other one of the first-band carriers or rather to add to the first-RAT connection the second-band carrier. And in that case, the act of configuring carrier-aggregation service for the UE in accordance with the decision could involve (i) if the decision is to add to the first-RAT connection the other one of the first-band carriers, then adding to the first-RAT connection the other one of the first-band carriers rather than the second-band carrier, and (ii) if the decision is to add to the first-RAT connection the second-band carrier, then adding to the first-RAT connection the second-band carrier rather than the other one of the first-band carriers.

Alternatively, the act of making the decision of whether to configure the intra-band carrier-aggregation service or rather the inter-band carrier-aggregation service could involve deciding whether to direct the UE to scan for first-band secondary coverage or rather to direct the UE to scan for second-band secondary coverage. And in that case, the act of configuring carrier-aggregation service for the UE in accordance with the decision could involve (i) if the decision is to direct the UE to scan for first-band secondary coverage, then directing the UE to scan for first-band secondary coverage, receiving from the UE a report that the UE has detected threshold strong coverage of the other one of the first-band carriers, and adding the other one of the first-band carriers to the first-RAT connection, and (ii) if the decision is to direct the UE to scan for second-band secondary coverage, then directing the UE to scan for second-band secondary coverage, receiving from the UE a report that the UE has detected threshold strong coverage of the second-band carrier, and adding the second-band carrier to the first-RAT connection.

Figure 3:
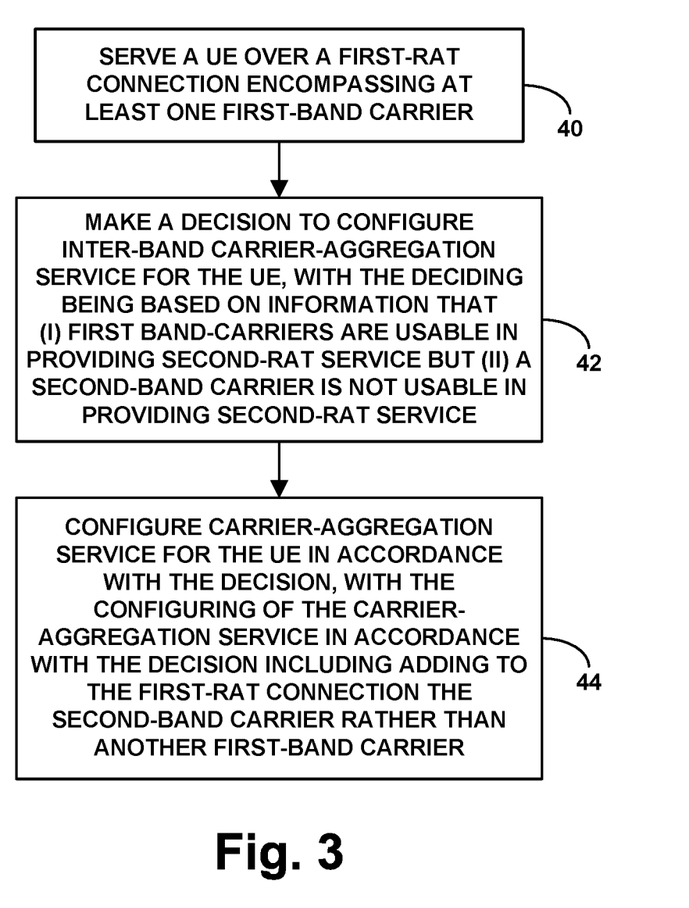
FIG. 3 is another flow chart depicting an example method in accordance with the present disclosure.

FIG. 3 is another flow chart depicting a method that could be carried out in accordance with this disclosure, for a wireless communication system to configure service of a UE. Here again, the wireless communication system supports a first RAT (e.g., 4G LTE) and a second RAT (e.g., 5G NR) and operation on first-band carriers (e.g., B41 carriers) and at least one second-band carrier (e.g., B25 carrier). And again, the method could be carried out by or on behalf of a base station in such a system and/or by one or more other entities of the system.

As shown in FIG. 3, at block 40, the method includes the system serving the UE over a first-RAT connection encompassing at least one of the first-band carriers. Further, at block 42, the method includes the system making a decision to configure inter-band carrier-aggregation service for the UE, with the deciding being based on information that (i) the first band-carriers are usable in providing second-RAT service but (ii) the second-band carrier is not usable in providing second-RAT service. For instance, the system could be provisioned with such information in the form of data defining carrier-usage policies, regulations or the like. And at block 44, the method includes the system configuring carrier-aggregation service for the UE in accordance with the decision, with the configuring of the carrier-aggregation service in accordance with the decision including adding to the first-RAT connection the second-band carrier rather than another one of the first-band carriers.

Various features described above can be implemented in this context, and vice versa.

For example, as discussed above, the first-band carriers being usable in providing service under the second RAT could mean that the first-band carriers are usable as second-RAT carriers, and the second-band carrier not being usable in providing service under the second RAT could mean that the second-band carrier are not usable as a second-RAT carrier. Or the first-band carriers being usable in providing service under the second RAT could mean that the first-band carriers are usable as first-RAT carriers in dual-connectivity service on the first RAT and the second RAT, and the second-band carrier not being usable in providing service under the second RAT could mean that the second-band carrier is not usable as a first-RAT carrier in dual-connectivity service on the first RAT and the second RAT.

Figure 4:
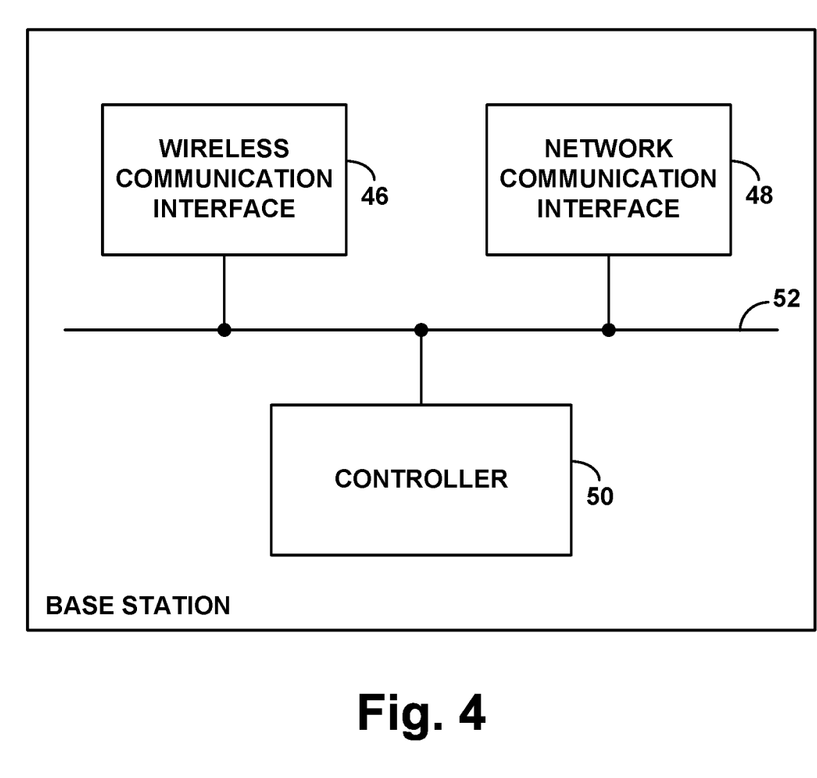
FIG. 4 is a simplified block diagram of an example base station operable in accordance with the present disclosure.

FIG. 4 is a next a simplified block diagram depicting an example base station that could operate in accordance with the present disclosure to control service of a UE. As shown, the example base station includes a wireless communication interface 46, a network communication interface 48, and a controller 50, all of which could be communicatively linked together by a system bus, network, or other connection mechanism 52. This base station could be configured to provide wireless service according to a first RAT and could operate on a plurality of first-RAT carriers, and the base station could be implemented in a system that further includes a second base station that is configured to provide wireless service according to a second RAT and that operates on at least one second-RAT carrier, among other possibilities.

The wireless communication interface 46 of the base station could comprise an antenna structure, which could be tower mounted or may could other forms, and associated components such as a power amplifier and a wireless transceiver, so as to facilitate providing a coverage area defining an air interface having a downlink and an uplink, and engaging in transmission and reception of bearer and control data over the air interface in accordance with the first RAT. In this or one or more other ways, the base station could thus be configured to provide air-interface service through the wireless communication interface.

The network communication interface 48 could comprise a wired or wireless interface, such as an Ethernet network communication interface, configured to support communication with other entities, such as with other base stations or core-network entities. Thus, the base station could be configured to communicate on a core network through the network communication interface.

Further, the controller 50 could comprise a processing unit (e.g., one or more general purpose processors and/or specialized processors), non-transitory data storage (e.g., one or more volatile and/or non-volatile storage components, such as magnetic, optical, or flash storage), and program instructions stored in the data storage and executable by the processing unit to cause the base station to carry out various operations such as those discussed above.

For instance, the operations could include, while the base station is serving the UE over a first-RAT connection that encompasses at least one first-band carrier, making a decision of whether to configure for the UE intra-band carrier-aggregation service by adding to the connection another first-band carrier or rather to configure for the UE inter-band carrier-aggregation service by adding to the connection a second-band carrier, with making the decision being based on determining of whether (i) the other first-band carrier is usable in providing service according to a second RAT and (ii) the second-band carrier is not usable in providing service according to the second RAT. And the operations could include configuring carrier-aggregation service for the UE in accordance with the decision.

Here too, various features discussed above can be implemented in this context, and vice versa.

The present disclosure also contemplates a non-transitory computer-readable medium being encoded, programmed, storing, and/or otherwise embodying program instructions executable by a processing unit to carry out various features described herein.

Exemplary embodiments have been described above. Those skilled in the art will understand, however, that changes and modifications may be made to these embodiments without departing from the true scope and spirit of the invention.

We claim:

1. A method for a wireless communication system to configure service of a user equipment device (UE), wherein the system supports a first radio access technology (RAT) and a second RAT and the system supports operation on carriers in a first band (first-band carriers) and at least one carrier in a second band (second-band carrier), the method comprising:

serving, by the system, the UE over a first-RAT connection encompassing at least one of the first-band carriers;

making a decision, by the system, of whether to configure for the UE intra-band carrier-aggregation service by adding to the first-RAT connection another one of the first-band carriers or rather to configure for the UE inter-band carrier-aggregation service by adding to the first-RAT connection the second-band carrier, wherein making the decision is based on determining of whether (i) the other one of the first-band carriers is usable in providing second-RAT service and (ii) the second-band carrier is not usable in providing second-RAT service; and configuring, by the system, carrier-aggregation service for the UE in accordance with the decision.

2. The method of claim 1, wherein making the decision comprises deciding to configure the inter-band carrier aggregation rather than the intra-band carrier aggregation, the deciding being based on determining that (i) the other first-band carrier is usable in providing second-RAT service and (ii) the second-band carrier is not usable in providing second-RAT service.

3. The method of claim 2, wherein the deciding to configure the inter-band carrier-aggregation rather than the intra-band carrier aggregation is additionally based on a determination that there is threshold heavy load on the first-band carriers.

4. The method of claim 1, wherein the determining of whether the other one of the first-band carriers is usable in providing second-RAT service and the second-band carrier is not usable in providing second-RAT service comprises determining that (i) the other one of the first-band carriers is usable as a second-RAT carrier and (ii) the second-band carrier is not usable as a second-RAT carrier.

5. The method of claim 1, wherein the determining of whether the other one of the first-band carriers is usable in providing second-RAT service and the second-band carrier is not usable in providing second-RAT service comprises determining that (i) the other one of the first-band carriers is usable as a first-RAT carrier in dual-connectivity service on the first RAT and the second RAT and (ii) the second-band carrier is not usable as a first-RAT carrier in dual-connectivity service on the first RAT and the second RAT.

6. The method of claim 1, wherein configuring carrier-aggregation service for the UE comprises transmitting over the air to the UE a connection-reconfiguration message that specifies multiple carriers encompassed by the first-RAT connection.

7. The method of claim 1,
wherein making the decision of whether to configure the intra-band carrier-aggregation service or rather the inter-band carrier-aggregation service comprises deciding whether to add to the first-RAT connection the other one of the first-band carriers or rather to add to the first-RAT connection the second-band carrier, and
wherein configuring carrier-aggregation service for the UE in accordance with the decision comprises (i) if the decision is to add to the first-RAT connection the other one of the first-band carriers, then adding to the first-RAT connection the other one of the first-band carriers rather than the second-band carrier, and (ii) if the decision is to add to the first-RAT connection the second-band carrier, then adding to the first-RAT connection the second-band carrier rather than the other one of the first-band carriers.

8. The method of claim 1,
wherein making the decision of whether to configure the intra-band carrier-aggregation service or rather the inter-band carrier-aggregation service comprises deciding whether to direct the UE to scan for first-band secondary coverage or rather to direct the UE to scan for second-band secondary coverage, and
wherein configuring carrier-aggregation service for the UE in accordance with the decision comprises (i) if the decision is to direct the UE to scan for first-band secondary coverage, then directing the UE to scan for first-band secondary coverage, receiving from the UE a report that the UE has detected threshold strong coverage of the other one of the first-band carriers, and adding the other one of the first-band carriers to the first-RAT connection, and (ii) if the decision is to direct the UE to scan for second-band secondary coverage, then directing the UE to scan for second-band secondary coverage, receiving from the UE a report that the UE has detected threshold strong coverage of the second-band carrier, and adding the second-band carrier to the first-RAT connection.

9. The method of claim 1, wherein the first-band is B41, the second band is B25, the first RAT is 4G LTE, and the second RAT is 5G NR.

10. A method for a wireless communication system to configure service of a user equipment device (UE), wherein the system supports a first radio access technology (RAT) and a second RAT and the system supports operation on carriers in a first band (first-band carriers) and at least one carrier in a second band (second-band carrier), the method comprising:
serving, by the system, the UE over a first-RAT connection encompassing at least one of the first-band carriers;
making a decision, by the system, to configure inter-band carrier-aggregation service for the UE, the deciding being based on information that (i) the first band-carriers are usable in providing second-RAT service but (ii) the second-band carrier is not usable in providing second-RAT service; and
configuring, by the system, carrier-aggregation service for the UE in accordance with the decision, wherein configuring the carrier-aggregation service in accordance with the decision comprises adding to the first-RAT connection the second-band carrier rather than another one of the first-band carriers.

11. The method of claim 10, wherein the first-band carriers being usable in providing service under the second RAT comprises the first-band carriers being usable as second-RAT carriers, and wherein the second-band carrier not being usable in providing service under the second RAT comprises the second-band carrier not being usable as a second-RAT carrier.

12. The method of claim 10, wherein the first-band carriers being usable in providing service under the second RAT comprises the first-band carriers being usable as first-RAT carriers in dual-connectivity service on the first RAT and the second RAT, and wherein the second-band carrier not being usable in providing service under the second RAT comprises the second-band carrier not being usable as a first-RAT carrier in dual-connectivity service on the first RAT and the second RAT.

13. The method of claim 10, wherein the first-band is B41, the second band is B25, the first RAT is 4G LTE, the second RAT is 5G NR.

14. A base station system configured to control service of a user equipment device (UE), the base station system comprising:
a wireless communication interface through which the base station system is configured to provide air-interface service;
a network communication interface though which the base station system is configured to communicate on a core network; and
a controller for controlling the service of the UE, wherein the controller is configured to cause the base station system to carry out operations comprising:
while the base station is serving the UE over a connection according to a first radio access technology (RAT) and the connection encompasses at least one carrier in a first band, making a decision of whether to configure for the UE intra-band carrier-aggregation service by adding to the connection another carrier in the first band or rather to configure for the UE inter-band carrier-aggregation service by adding to the connection a carrier in a second band, wherein making the decision is based on determining of whether (i) the other carrier in the first band is usable in providing service according to a second RAT and (ii) the carrier in the second band is not usable in providing service according to the second RAT; and configuring carrier-aggregation service for the UE in accordance with the decision.

15. The base station of claim 14, wherein making the decision comprises deciding to configure the inter-band carrier aggregation rather than the intra-band carrier aggregation, the deciding being based on the determining being that (i) the other carrier in the first band is usable in providing service according to the second RAT and (ii) the carrier in the second band is not usable in providing service according to the second RAT.

16. The base station of claim 15, wherein the deciding to configure the inter-band carrier-aggregation rather than the intra-band carrier aggregation is additionally based on a determination that there is threshold heavy load on the first-band carriers.

17. The base station of claim 14, wherein the other carrier in the first band being usable in providing service according to the second RAT comprises the other carrier in the first band being usable to carry communications according to the second RAT, and wherein the carrier in the second band not being usable in providing service according to the second RAT comprises the carrier in the second band not being usable to carry communications according to the second RAT.

18. The base station of claim 14, wherein the other carrier in the first band being usable in providing service according to the second RAT comprises the other first-band carrier being usable to as a first-RAT carrier in dual-connectivity service on the first RAT and the second RAT, and wherein the carrier in the second band not being usable in providing service according to the second RAT comprises the carrier in the second band not being usable as a first-RAT carrier in the dual-connectivity service on the first RAT and the second RAT.

19. The base station of claim 14, wherein the first-band is B41, the second band is B25, the first RAT is 4G LTE, the second RAT is 5G NR.

20. The base station of claim 14, wherein the controller comprises a processing unit, non-transitory data storage, and program instructions stored in the non-transitory data storage and executable by the processing unit to cause the base station to carry out the operations.

* * * * *